US008565789B2

(12) United States Patent
Staffaroni et al.

(10) Patent No.: US 8,565,789 B2
(45) Date of Patent: Oct. 22, 2013

(54) AUTOMATIC SERVICE VEHICLE HAILING AND DISPATCH SYSTEM AND METHOD

(75) Inventors: Giuseppe Staffaroni, Pleasanton, CA (US); Matteo Monteverdi, Redwood City, CA (US); John A. Lynch, Campbell, CA (US); Harry W. Printz, San Francisco, CA (US)

(73) Assignee: Promptu Systems Corporation, Menlo Park ( * ) Notice: Subject to any disclaimer, the term of this patent is extended or adjusted under 35 U.S.C. 154(b) by 336 days.

(21) Appl. No.: 13/168,685

(22) Filed: Jun. 24, 2011

(65) Prior Publication Data

US 2011/0320232 A1     Dec. 29, 2011

Related U.S. Application Data

(63) Continuation of application No. 12/335,336, filed on Dec. 15, 2008, now Pat. No. 8,005,488.

(60) Provisional application No. 61/007,756, filed on Dec. 14, 2007.

(51) Int. Cl.
*H04W 24/00* (2009.01)

(52) U.S. Cl.
USPC .................................... 455/456.2; 455/414.2

(58) Field of Classification Search
USPC ...................... 455/456.2, 414.2, 414.3, 404.2
See application file for complete search history.

(56) References Cited

U.S. PATENT DOCUMENTS

| | | | | |
|---|---|---|---|---|
| 7,548,610 | B2 * | 6/2009 | Sierra et al. | 379/88.01 |
| 8,238,525 | B2 * | 8/2012 | Zhang et al. | 379/88.01 |
| 8,363,792 | B2 * | 1/2013 | Merrow et al. | 379/69 |
| 8,411,830 | B2 * | 4/2013 | Gilbert et al. | 379/93.01 |
| 2002/0141547 | A1 | 10/2002 | Okinak | |
| 2003/0053475 | A1 | 3/2003 | Veeraraghavan et al. | |
| 2004/0148160 | A1 | 7/2004 | Ramabadran | |

FOREIGN PATENT DOCUMENTS

| WO | 01/22645 A1 | 3/2001 |
|---|---|---|
| WO | 01/95312 A1 | 12/2001 |

* cited by examiner

*Primary Examiner* — Brian Young
(74) *Attorney, Agent, or Firm* — Gard & Kaslow LLP (57) ABSTRACT

A system and method are provided for improving efficiency of operation and convenience of access to a fleet of taxis, or other service vehicles, requiring rapid, on-demand dispatch to customer-determined locations. Automatic speech recognition (ASR) and/or radiolocation technology are used to automate the entry of the customer pickup location, and optionally the dropoff location and other relevant information as well. A customer speaks the pickup location into a cellular telephone which then digitizes and transmits it as a data communication to an ASR system. The ASR system decodes the digitized utterance into a pickup location which is passed to a vehicle matching and dispatch system. The vehicle matching and dispatch system matches a taxi and dispatches it to the pickup location. In one embodiment, the identified pickup location is transmitted to the customer's cellular telephone for confirmation or correction, before dispatch of the requested taxi.

9 Claims, 3 Drawing Sheets

AUTOMATIC SERVICE VEHICLE HAILING AND DISPATCH SYSTEM AND METHOD

CROSS-REFERENCE TO RELATED APPLICATIONS

This application is a continuation of U.S. patent application Ser. No. 12/335,336, filed Dec. 15, 2008 now U.S. Pat. No. 8,005,488 and published as US 2009/0156241 A1 on Jun. 18, 2009, which is incorporated by reference herein and which claims priority of U.S. Provisional Patent Application No. 61/007,756, entitled "Automatic Service Vehicle Hailing and Dispatch System," filed Dec. 14, 2007, the disclosure of which is incorporated herein by reference.

BACKGROUND

1. Field of the Invention

The invention is in the field of service vehicle hailing, and more particularly through use of a cellular telephone handset.

2. Description of the Prior Art

A dispatch-based taxi fleet comprises a collection of taxis (one type of service vehicle), distributed within some geographic region, and a central dispatch office. Typically, the central dispatch office has an automatic means for tracking the location of each active service vehicle, based for instance on the global positioning system (GPS), or some other suitable radiolocation technology.

A primary function of the central dispatch office is to receive customer pickup requests, match them with available service vehicles, and dispatch the service vehicle to the customer. This is typically done through the following steps:

1. A customer places a conventional telephone call to the central dispatch office, and is connected with a human operator, also called a "telephonist."
2. The customer supplies the desired pickup address. Sometimes the destination address, and additional information or parameters such as desired characteristics of the service vehicle (e.g., extra large capacity), may be supplied as well.
3. The telephonist identifies a suitable service vehicle, ideally located close to the requested pickup address.
4. The service vehicle is assigned to the customer, and proceeds to the requested pickup location.
5. The telephonist confirms the dispatch of the service vehicle to the customer.
6. Optionally, the telephonist may supply to the customer a reservation or confirmation number, and/or a number identifying the dispatched service vehicle. While not common in the US market, this is typical in the European market. The service vehicle identifier enables the customer to ensure that they are taking the right taxi. The reservation or confirmation number enables the driver to ensure that they are serving the right customer. The reservation or confirmation number also allows the customer to recontact the dispatch office at a later time to check the progress of the dispatched vehicle and/or cancel the dispatch request should the customer's needs change.
7. The telephonist and the customer end their telephone call and the customer waits for pickup by the service vehicle.
8. The service vehicle meets the customer and takes them to the desired location.

One major cost of operating this system is the labor cost of the telephonist. The telephonist is occupied, by a single caller, from step 1 through step 7 above inclusive. The labor cost of the telephonist, and the associated costs of office space, telephone equipment, etc., place a limit on the size of taxi fleet businesses.

Some attempts have been made to eliminate the telephonist. One solution uses automated speech recognition (ASR) technology to automate the interaction with the customer, deploying this technology in what is referred to as an interactive voice response (IVR) mode. In such a solution, the customer again places a conventional audio telephone call to the dispatch office. However, the call is answered not by a human operator, but by a computer system equipped with ASR and text to speech (TTS) technology. This computer system attempts to perform the function of a human telephonist. The customer is prompted to speak the pickup address. The customer's spoken response, propagated over the conventional telephone system, is then processed by the ASR technology in an attempt to yield the pickup address. The remaining steps are also completed by automatic means, and the service is nominally rendered to the customer as described above. This design is offered commercially now, by Raywood Communications Pty Ltd, of Victoria, Australia, and Sigtec Pty Ltd, of Seaford, Australia.

This prior approach, while in principle offering an advantage over the use of human telephonists, has limitations in practice. One problem is the use of a conventional wireline or wireless audio telephony channel, where the caller's audio is subjected to arbitrary noise, dropouts or other corruptions. This reduces the accuracy of the speech recognition system, sometimes rendering the proposed solution unusable. Another problem is the rigid structure of the computer system, which can accept and respond to only a limited number of predefined commands or inputs, and which must interact with the customer exclusively via audio input and output. All of these present obstacles to the success of this prior solution.

Another potential solution is the use of Short Message Service (SMS) or text messages, sent from a cellular telephone handset. With SMS, modern cellular telephones support the composition of brief text messages (up to 160 characters in length), which may then be transmitted wirelessly to another cellular telephone, or to a suitable computer interface. In such a system the customer composes a text message comprising the address of the desired pickup location. This text message is wirelessly transmitted to a suitable computer system operated by the taxi fleet operator. This computer interprets the address, and assuming it represents a valid pickup location, proceeds to assign a suitable service vehicle to the customer. The computer sends a confirming text message back to the customer, advising of imminent pickup. This design is offered commercially now, by Sigtec Pty Ltd, of Seaford, Australia.

However, this approach also has limitations, for example, the need for the customer to compose the text message containing the pickup address, a maximum text message size of 160 characters, etc.

What is needed, therefore, is an improved dispatch system that can eliminate the costs and inconveniences described above while still providing reliable and convenient customer service.

SUMMARY

In one embodiment is provided a method of dispatching a service vehicle comprising receiving into a cellular telephone a spoken utterance from a customer indicating a requested location for a service vehicle, digitizing or coding in the cellular telephone the received spoken utterance, transmitting the digitized spoken utterance as a data communication from the cellular telephone to a speech recognition system, identifying a pickup location by interpreting the transmitted spoken utterance in the speech recognition system, transmitting the pickup location from the speech recognition system to a vehicle dispatch system, matching the pickup location to a service vehicle in the vehicle dispatch system, and dispatching the matched service vehicle to the pickup location.

In another embodiment is provided a method of dispatching a service vehicle comprising receiving into a cellular telephone a spoken utterance from a customer indicating a requested location for a service vehicle, digitizing or coding in the cellular telephone the received spoken utterance, transmitting the digitized spoken utterance as a data communication from the cellular telephone to a speech recognition system via a controller, identifying one or more pickup locations by interpreting the transmitted spoken utterance in the speech recognition system, transmitting the identified one or more pickup locations as a data communication from the speech recognition system to the cellular telephone via the controller, receiving at the cellular telephone a confirmation from the customer that one of the one or more pickup locations matches the requested location, transmitting the confirmed pickup location as a data communication from the cellular telephone to the speech recognition system, transmitting the confirmed pickup location from the speech recognition system to a vehicle dispatch system, matching the confirmed pickup location to a service vehicle in the vehicle dispatch system, and dispatching the matched service vehicle to the confirmed pickup location.

In a still further embodiment is provided a method of dispatching a service vehicle comprising receiving into a cellular telephone a spoken utterance from a customer indicating a requested location for a service vehicle, digitizing or coding in the cellular telephone the received spoken utterance, transmitting the digitized spoken utterance as a data communication from the cellular telephone to a speech recognition system via a controller, identifying a pickup location by interpreting the transmitted spoken utterance in the speech recognition system, transmitting the identified pickup location as a data communication from the speech recognition system to the cellular telephone via the controller, receiving at the cellular telephone a correction from the customer to the pickup location, transmitting the corrected pickup location as a data communication from the cellular telephone to the speech recognition system, transmitting the corrected pickup location from the speech recognition system to a vehicle dispatch system, matching the corrected pickup location to a service vehicle in the vehicle dispatch system, and dispatching the matched service vehicle to the corrected pickup location.

DETAILED DESCRIPTION

Systems and methods are provided for improving efficiency of operation and convenience of access to service vehicles, such as taxis, which require rapid, on-demand dispatch to customer-specified locations. These systems and methods involve the use of automatic speech recognition (ASR) and/or radiolocation technology to reliably automate the entry and identification of the customer pickup location, and optionally the dropoff location and other relevant information as well.

In particular, a customer speaks the location of where the service vehicle is requested into a cellular telephone (colloquially referred to as a "cellphone"). The cellular telephone digitizes or codes the spoken utterance and transmits it via a data communication channel to an ASR system. Sending the digitized or coded utterance as a data communication avoids the prior art telephone audio communication problems of arbitrary noise, dropouts or other corruption, etc. The ASR system, using ASR decoding techniques as described elsewhere herein, interprets the digitized or coded utterance to determine the pickup location. A service vehicle dispatch system matches the pickup location with an available service vehicle and dispatches the matched service vehicle to the pickup location.

In some embodiments, the determined pickup location is transmitted back to the customer of the cellular telephone. In this way, the customer has the opportunity to confirm that the pickup location matches the requested location, correct the pickup location, or begin the process anew by again speaking the requested location into the cellular telephone. Numerous additional capabilities and alternative embodiments and implementations are further described herein.

Figure 1:
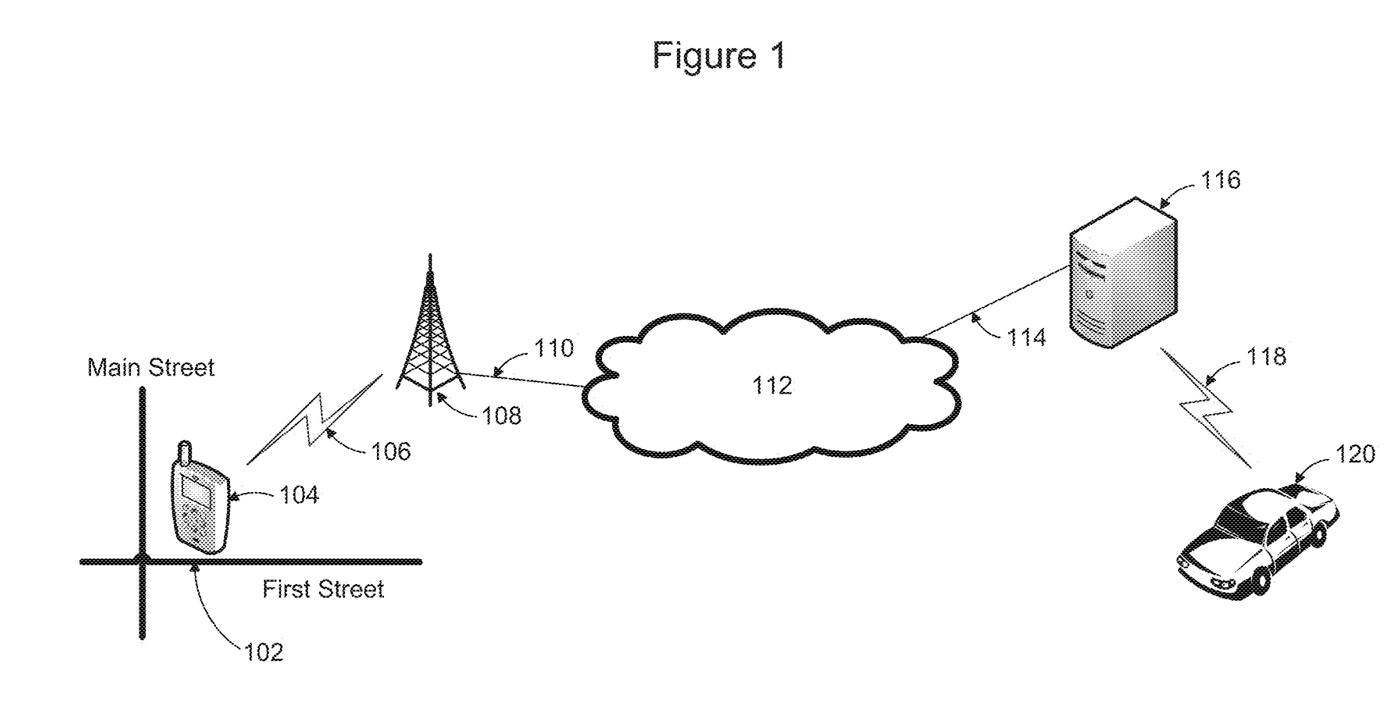
FIG. 1 is a diagram of one exemplary embodiment of the present invention in operation.

Referring now to FIG. 1, a diagram of one exemplary embodiment of the present invention in operation can be seen. In this example, a customer is currently located at a numbered street address 102 (e.g., "110 First Street"), near the intersection of First Street and Main Street. The customer speaks the numbered street address (again, e.g., "110 First Street") into the cellular telephone 104. The cellular telephone digitizes the speech and transmits it as a data communication across a data communication channel to be received by a Recognition and Dispatch System 116.

The data communication transmission begins as a wireless communication 106 from the cellular telephone 104 to a cellular telephone tower 108. The data communication transmission then becomes a wired communication 110 from the cellular telephone tower to the Internet, represented as a cloud 112 in FIG. 1, to another wired communication 114, to the Recognition and Dispatch System 116.

Because the digitized utterance is propagated over an error- and flow-controlled communication link, the digitized audio arrives with no channel noise or loss of signal or information. This effectively reduces to zero the probability of corruption of the data in transit. Notably, digitized speech, captured from the cellular telephone handset audio system, may be propagated over such a connection. This can be referred to as speech propagated over the data channel or use of the data channel or use of a data connection or a data communication channel. Two characteristics of note are (a) speech propagated in this fashion is not subject to drop-outs or packet loss (since any missing data packets are detected and retransmitted), and (b) the cellular telephone programmer may nominally choose the representation or coding scheme of the digitized speech, and may thereby benefit from the use of a high-fidelity representation. This avoids using an inferior codec, thereby increasing speech recognition accuracy.

It is to be understood that the coding or processing of speech that takes place on the cellular telephone may radically transform the representation of the spoken utterance, up to and including the representation of the user's utterance as a sequence of so-called speech feature vectors, which may themselves be subject to further coding or compression. This amounts to performing the first stage of the speech recognition computation on the cellular telephone.

It is to be understood that the operation is not limited to any particular implementation of a data communication channel. While the use of conventional cellular telephony technology is the one described, alternatives which support the exchange of digital data are possible. For instance, the cellular telephone may be capable of direct connection to a wireless local area network (WLAN). This case, and others not mentioned here, is also intended to be supported and covered herein.

It is also to be understood that although not shown, additional steps and facilities are typically involved in the wired communication between the cellular telephone tower 108 and the Recognition and Dispatch System 116 some of which may include forms of wireless communications.

Figure 2:
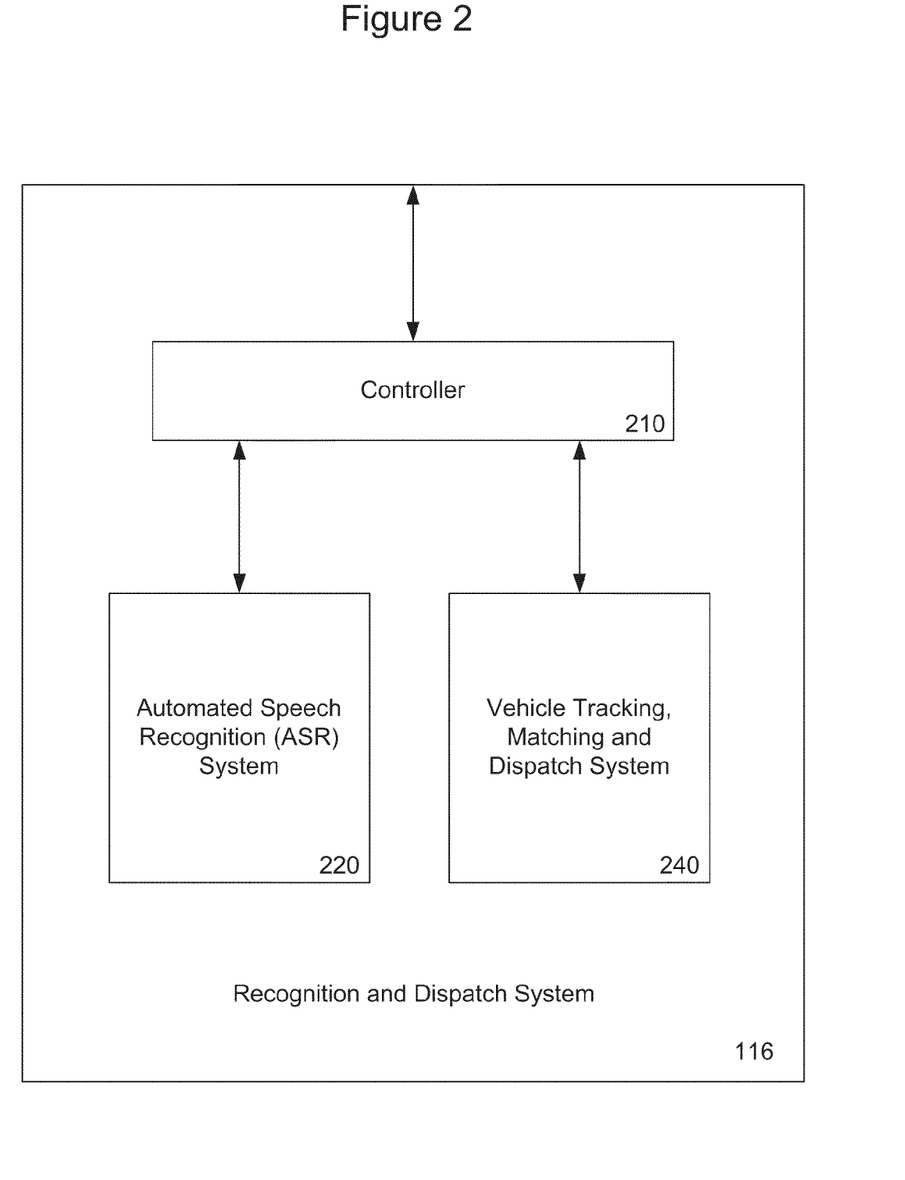
FIG. 2 is a block diagram of an exemplary Recognition and Dispatch System.

Referring now to FIG. 2, greater detail of an exemplary Recognition and Dispatch System 116 can be seen. In this example, Recognition and Dispatch System 116 comprises a Controller 210, an Automated Speech Recognition (ASR) System 220 and a Vehicle Tracking, Matching and Dispatch System 240.

The digitized utterance sent as a data communication from the cellular telephone 104 (see FIG. 1) to the Recognition and Dispatch System 116 is received by Controller 210 which passes it on to ASR System 220. ASR System 220 interprets the digitized utterance to determine a pickup location.

In some embodiments, referring again to FIG. 1, the determined pickup location is transmitted as a data communication back to the cellular telephone 104 via wired communication 114, Internet cloud 112, wired communication 110, cellular telephone tower 108 and wireless communication 106. Upon receipt of the determined pickup location at the cellular telephone 104, the customer can confirm or correct the pickup location or start the process over as described elsewhere herein.

Referring again to FIG. 2, the determined pickup location is passed from the ASR System 220 through Controller 210 to the Vehicle Tracking, Matching and Dispatch System 240. Vehicle Tracking, Matching and Dispatch System 240, whose job it is to track a fleet of service vehicles, determines which service vehicle (e.g., service vehicle 120 of FIG. 1) best matches the pickup location using techniques known in the art and dispatches that service vehicle to the pickup location via wireless communication 118. It is to be understood that dispatching the service vehicle 120 via wireless communication 118 can be performed by a communication from Vehicle Tracing, Matching and Dispatch System 240 to service vehicle 120 without going through Controller 210.

Depending upon embodiment and implementation, numerous additional steps, features and capabilities are involved or included in the various operations. The following identifies some of the many possibilities.

In one embodiment, the customer interacts with a standalone application running on the cellular telephone 104 which application digitizes or codes the customer's spoken utterance and communicates with a server application running on the Recognition and Dispatch System 116. In an alternative embodiment, the customer instead interacts with a web browser based interface on the cellular telephone 104 which interface is provided or driven by a web server running on the Recognition and Dispatch System 116. In a further alternative embodiment, the browser based application is a voice browser which operates via spoken commands. In this way, most if not all of the interaction with the voice browser based application can be by spoken commands rather than button presses on the cellular telephone. Details and benefits of standalone applications versus browser based applications and standard browser based applications versus voice browser based applications are known in the art.

In the case of a standalone application running on the cellular telephone 104, this application can be written in the Java programming language. Alternative known programming languages and environments can likewise be used including BREW, Microsoft Windows Mobile, and the Symbian programming environment, for example.

It is envisioned that when a customer operates the application running on the cellular telephone 104 the metaphor is one of form-filling. That is, in one embodiment, the customer views a cellular telephone display with fields corresponding to pickup location, an optional dropoff location, an optional number of passengers, etc. The customer proceeds to populate these fields with the desired information. Certain pieces of information may be supplied by spoken command, which is a great convenience. Another is that the customer may move freely from one field to another, completing them in any desired order, and ignoring those that are not pertinent to his or her service request. This is particularly true on an embodiment using a browser based application. In this fashion, the customer can navigate through the displayed form, filling out or altering various service features. It is envisioned that this will largely be accomplished with button presses to navigate among the various fields, with dropdown lists to specify special service features (large capacity, etc) or direct button entry of (for instance) the passenger count.

Further, in interacting with the cellular telephone, a variety of embodiments to capture or gate the user's spoken utterance are possible. In one embodiment, that of push-to-talk, the user presses and holds a designated push-to-talk button or control, speaks his or her desired command, and releases the button; audio is captured from the moment that the button is pushed to the moment it is released. In a further embodiment, that of push-to-start, push-to-stop, the user instead presses a button or control once to indicate to the cellular telephone when to begin capturing the spoken utterance and presses a button or control once again to indicate to the cellular telephone when to stop capturing the spoken utterance. In a further embodiment, that of push-to-start, the user presses a button or control once to indicate to the cellular telephone when to begin capturing the spoken utterance; audio capture continues until either the user is determined by automatic means to have stopped vocalizing, or until a predetermined maximum duration of audio capture is reached. In a further embodiment, that of active prompt, the user is prompted to speak by a visible and/or audible signal, and audio is captured until either the user is determined by automatic means to have stopped vocalizing, or a predetermined maximum duration of audio capture is reached. In yet another embodiment, the cellular telephone is programmed to listen based on the angle of the cellular telephone (that is, the angle at which it is being held, with respect to the vertical direction, indicates that the customer is going to enter a spoken utterance). Note that such angle-based triggering of some functionality is known in the art of cellular telephones.

In one embodiment the Recognition and Dispatch System 116 operates as a single computing system configuration. In another embodiment, the individual components of the Recognition and Dispatch System 116 operate on separate computing system configurations either co-located or, in some instances, located in physically separate facilities. As such, data transmissions between the modules of Recognition and Dispatch System 116 shown in FIG. 2 can occur as communications between one software module and another software module operating on the same computing system or as communications between one software module operating on one computing system and another software module operating on another computing system, either via a local area network communication in the case of co-location of the computing systems or via other network communications such as the Internet in the case of the computing systems not being co-located. This latter scenario supports a configuration with a single ASR system and/or Controller in communication with more than one Vehicle Tracking, Matching and Dispatch System each operated by a different taxi company/fleet. It is also to be understood that the various functionalities and operations described herein as being part of the controller module of the recognition and dispatch system could be integrated into the ASR system and the Vehicle Tracking, Matching and Dispatch System modules, as appropriate. Likewise it is to be understood that the modules described as making up the Recognition and Dispatch System 116 can be any combination of hardware, software or firmware.

It is to be understood that the term service vehicle encompasses any known form of transportation or service delivery now known or later developed. As such, service vehicles include taxis, limousines, shuttle busses, package or item deliveries, courier services, repair pickup services, etc.

It is also to be understood that the requested location and/or the pickup location is not limited to being a numbered street address, such as "110 First Street" in the example of FIG. 1 and, instead, can be any identifiable or known location, building, monument or landmark. For example, the location can be "The White House," "The Willard Hotel," or "The Washington Monument." Other examples include the "Main Police Station," the "Main Library," and the "Central Train Station."

Figure 3:
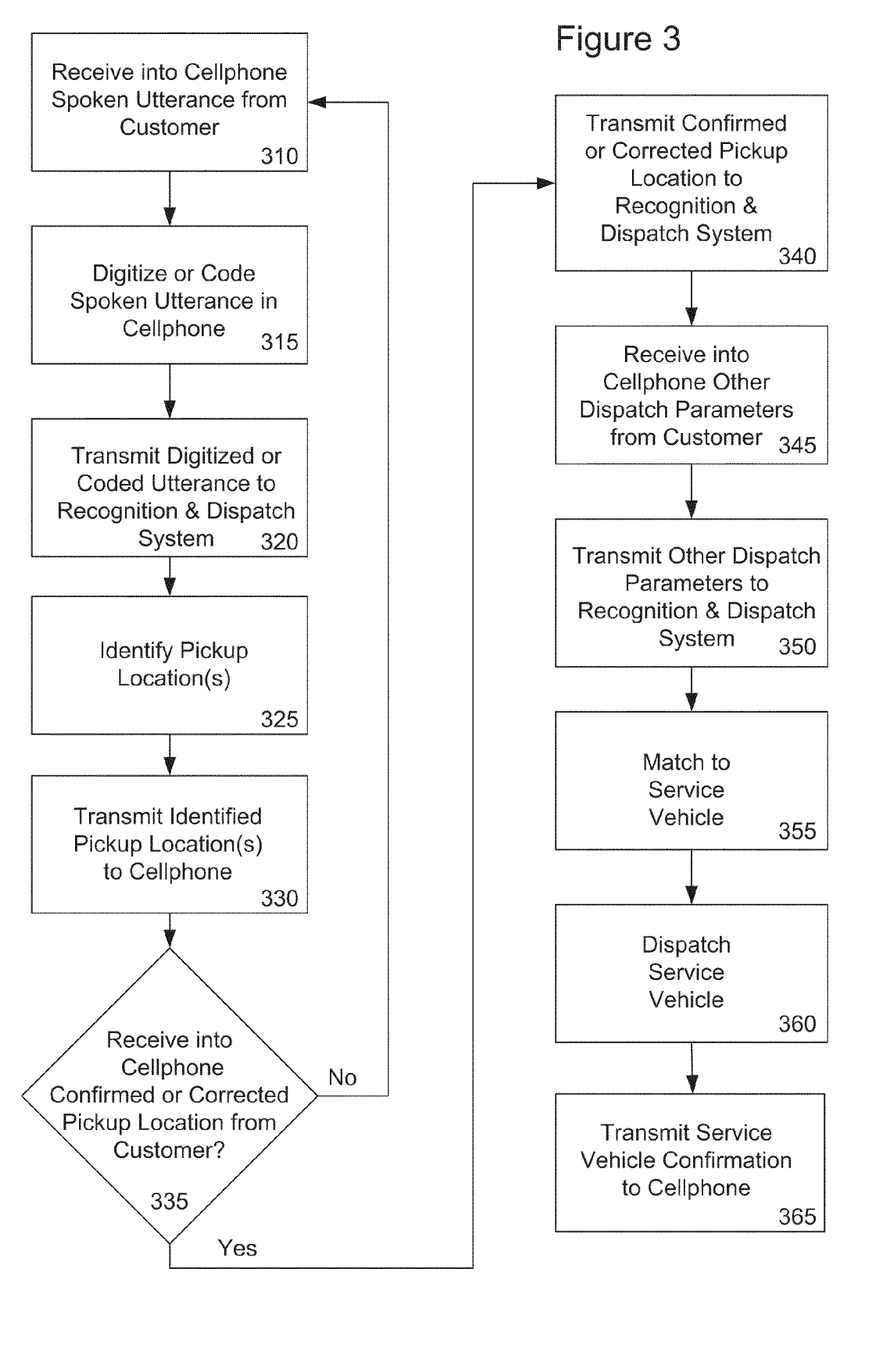
FIG. 3 is a flowchart of an exemplary method of service vehicle hailing and dispatch.

Referring now to FIG. 3, a flowchart of an exemplary method of service vehicle hailing and dispatch can be seen.

In step 310, the customer speaks a requested location which is received by an application or browser running on a cellular telephone.

In step 315, the spoken utterance is digitized or coded by the application or browser running on the cellular telephone.

In step 320, the digitized or coded utterance is transmitted as a data communication across a data communication channel from the cellular telephone to the recognition and dispatch system as described elsewhere herein.

In step 325, the pickup location is identified by an ASR system in recognition and dispatch system as described elsewhere herein. A grammar-based recognition system is envisioned, with the grammar specialized to the particular geographic region where the system is operating. The use of a grammar also simplifies the formatting of the utterance as a canonical street address, and if required, the encoding of street names into a catalog or index known to the Vehicle Tracking, Matching and Dispatch system. The use of an appropriately-constructed grammar also ensures that only street names that actually exist within a given locale of service will be recognized by the speech recognition system, preventing accidental or malicious attempts to dispatch taxis to non-existent streets. However, it is understood that the use of grammar-based ASR technology is not a requirement for this function.

In optional step 330, the identified pickup location is transmitted from the ASR System in the recognition and dispatch system to the customer's cellular telephone.

At this point, the customer can, in optional step 335, confirm that the identified pickup location matches the requested location or correct the identified pickup location. Alternatively, the customer can start the process over by returning to step 310.

To review and expand and as is understood, the ASR system recognizes the digitized speech, and returns one or more possible decodings of the utterance. Each decoding comprises recognized text, a canonical representation of the nominal street address, and a confidence score. If the confidence score of the top-ranked decoding is sufficiently high, and well-separated from the others on the list, that decoding alone is returned to the Controller. If the top decoding does not bear a sufficiently high confidence score, or is not sufficiently well separated from the other entries on the n-best list, the n-best list is returned to the Controller, for transmission and presentation to the customer's cellular telephone. Note that either the full n-best list may be returned to the customer, or a winnowed version of it, in which only decodings that meet some minimal threshold of confidence score are returned, or some other acceptance criterion is applied.

If a single result is returned, the associated text is displayed as the desired pickup location. If multiple results are returned, the customer is presented with the n-best list of possible decodings, and may select the correct decoding from the displayed list.

If the decoding displayed to the customer is incorrect—that is, if the single returned decoding was not correct, or if the correct decoding did not appear anywhere on the presented n-best list—then the customer has the option, by operation of a suitable button, to start the process over. It is notable that this reject-and-retry operation is conducted by the customer's silent reading of one or more proposed decodings from the display, and forcing a retry with a button press. This is considerably more rapid and convenient than interaction with a conventional, audio-output IVR system.

A variant of this is to note that one of the presented locations may be mostly correct, but erroneous in some easily correctable way, as by alteration of the numeric portion of an address. For instance, the number 18 may have been misrecognized as 80, or vice versa.

Because such cases may arise, and forcing the customer to retry or use another input mode may be cumbersome, the following variation is envisioned. The customer may accept one of the proposed decodings which is then further correctable or editable by the customer. Thus, to continue the form-filling metaphor previously mentioned, some field of this form will be populated with the selected decoding, but the customer can directly correct or edit the contents of this field thus making any desired corrections by appropriate button presses on the cellular telephone. An optional extension of this variation is that the corrected or edited contents of the field may subsequently be verified by the recognition and dispatch system to confirm that it constitutes a legal address.

In the event the customer confirms the identified pickup location, by for example pressing a button on the cellular telephone, or corrects the identified pickup location, by for example pressing one or more buttons on the cellular telephone to overwrite an incorrect portion of the identified pickup location, the confirmation or corrected pickup location is transmitted from the cellular telephone and received by the recognition and dispatch system in step 340.

In optional step 345, the application or browser running on the cellular telephone receives or has selected any other relevant dispatch parameters provided by the customer. These dispatch parameters can include, for example, the number of passengers needing to be picked up, the need for an oversized vehicle to accommodate large size packages or extra luggage, need for wheelchair access, payment instructions, dropoff location, etc.

In optional step 350, the other dispatch parameters are transmitted from the cellular telephone to the recognition and dispatch system.

It is to be understood that in some instances optional steps 345 and 350 can occur before step 325. It is to be further understood that in an instance in which step 345 occurs before step 325, steps 330 and 350 can be combined into a single transmission from the cellular telephone to the recognition and dispatch system of both the digitized or coded utterance and the other dispatch parameters.

It is to be understood that in some instances optional steps 345 and 350 can occur before step 340. It is to be further understood that in an instance in which step 345 occurs before step 340, steps 340 and 350 can be combined into a single transmission from the cellular telephone to the recognition and dispatch system of both the confirmed or corrected pickup location and the other dispatch parameters.

In step 355, a vehicle tracking, matching and dispatch system in recognition and dispatch system matches the pickup location to a service vehicle.

In step 360, the vehicle tracking, matching and dispatch system dispatches the matched service vehicle to the, optionally confirmed or corrected, pickup location. It is to be understood that this may involve a communication from the vehicle tracking, matching and dispatch system to the matched service vehicle without involvement by the controller of the recognition and dispatch system.

In optional step 365, the vehicle tracking, matching and dispatch system transmits a service vehicle confirmation to the customer's cellular telephone. This confirmation serves to provide the customer with confirmation that the requested service vehicle will arrive at the requested location. Optionally, the service vehicle confirmation includes a confirmation number or other designation. The service vehicle confirmation number can be used by the customer to ensure they are being served by the correct vehicle and can be used by the service vehicle operator to ensure they are serving the correct customer. The confirmation may further optionally include an estimated pickup time for the service vehicle.

In a further optional step (not shown) the identity of the assigned service vehicle, and the estimated pickup time is displayed on the cellular telephone. The unique reservation or confirmation number may be displayed as well.

It is to be understood that the specific order or sequence of steps described with referenced to FIG. 3 is not limiting. Other sequences can be utilized, for example, the steps of matching a service vehicle and dispatching the service vehicle can be performed before the steps of transmitting the pickup location to the customer's cellular telephone for confirmation and/or correction.

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

For example, it is envisioned that multiple competing taxi companies/fleets within a single metropolitan area may choose to operate with this system. In such a case, the customer could be prompted to select which taxi company/fleet is to receive service request. This can be done at the outset to become a default selection for a given customer. Alternatively, this can be done after transmission of the requested location to an ASR system which then identifies which particular taxi companies/fleets service that location. After such identification, in one embodiment, those taxi companies/fleets that service that location are transmitted back to the customer's cellular telephone for customer selection or, alternatively, the service request is simply sent by the Controller to one of the taxi companies/fleets that services that location.

As another example, in one alternative embodiment, instead of the customer providing the pickup location by speaking the address, the customer presses a button on the cellular telephone handset to activate a radiolocation function of the handset. The radiolocation function then generates a latitude and longitude, hereafter referred to as radiolocation coordinates or just coordinates, which can be used to identify the cellular telephone's current location, and used as the pickup location. The exact way of doing this permits several variations, as now described.

In one variation, the coordinates are propagated to the Recognition and Dispatch (RD) system, with no further confirmation on the part of the customer. Upon receiving the coordinates, the RD system forwards the latitude and longitude, along with the rest of the service request, to the Vehicle Tracking Matching and Dispatch (VTMD) system for fulfillment. This assumes that the VTMD system can directly process specification of the pickup location as a latitude and longitude.

In another variation, the coordinates are propagated to the Recognition and Dispatch (RD) system, with no further confirmation on the part of the customer. However, upon receiving the coordinates, the RD system finds the nearest legal street address to the specified coordinates, a process known as reverse geocoding. Methods for reverse geocoding are known in the art, and there exist commercially available implementations of this function. The resulting pickup address is then substituted for the coordinates in the service request, which is passed to the VTMD for fulfillment. This variation alleviates the requirement that the VTMD be able to process the pickup location as a latitude and longitude.

In a further variation, the candidate pickup addresses are returned to the cellular telephone handset, and displayed to the customer for confirmation and/or selection. Then, in essentially the same way that a nearly-correct ASR result can be edited by the customer into its nominally correct value, so too can the customer edit the selected output of the reverse geocoding system.

In an alternative embodiment, a non-speech implementation is envisioned which uses a standard Wireless Application Protocol (WAP) browser. The customer would populate the fields of the service request by button presses alone, using for instance so-called triple-tap or predictive text entry, or using the radiolocation feature described elsewhere herein, to supply the pickup address. (Non-speech input would be supported for all additional fields of the service request as well.) The rest of the operation would then be performed via normal data transfer and page download operations, as in the operation of a regular cellular telephone browser.

In a still further embodiment, a desired date and time of pickup can be entered by a customer, again by either spoken command or button manipulation, for the advance booking of service vehicles, rather than just for As Soon As Possible (ASAP) pickup. This can be further extended, in support of this mode of usage, to set alarms or reminders at one or more fixed intervals before the reserved pickup time, to remind the customer of the booking, and give forenotice of the need to prepare for pickup.

As is known in the art, it is not unusual for a given taxi customer to repeatedly shuttle among some limited set of locations, comprising, for example, home, office, train station, airport and a few favorite restaurants. Thus it would not be unusual for the same few addresses to be used as pickup and dropoff locations. This phenomenon can be used to enable yet another mode of data entry in one embodiment. Whenever a pickup or dropoff location is specified, by whatever means (thus, confirmed decoding of a spoken address, confirmed reverse geocoding of a radiolocation-determined address, validated textual entry of an address, or some other means), that address will be recorded in the application non-volatile memory. Thereafter, to populate either the pickup address field, or the optional dropoff address field, a customer can select that field, and then with a single appropriate button press, reveal a list of previous pickup or dropoff locations. By additional button manipulations, the customer can scroll up or down through this list, until the desired address is found. Upon selection by the customer, that address will populate the field in question.

The previously used pickup and dropoff location addresses can also be merged into a single list, since a dropoff location can become a pickup location. However, the two lists can also be kept segregated.

In a further embodiment, a count of how often each address is used as a pickup or dropoff location can be maintained, and the least-frequently-used entries or the least-recently-used entries then discarded if the list becomes too long for convenient navigation by scrolling.

As described elsewhere herein, the vehicle tracking, matching and dispatch system may supply a reservation or confirmation number, which uniquely identifies the service request or service reservation. This number, hereafter referred to as an RCN, may be stored within the cellular telephone handset, possibly with other pertinent details of the service request or reservation.

Retaining the RCN within the cellular telephone supports additional functionality, which can be executed automatically (that is, without requiring the assistance of a human telephonist).

For example, a customer may select a given service request or reservation (nominally the most recent or current request), and by an appropriate button manipulation, request a confirmation and/or estimated time of arrival (ETA) update. Upon activation, this function will send the RCN over the data channel to the Recognition and Dispatch (RD) system. Upon receipt of the RCN, the Controller will present the RCN to the VTMD system, which in this embodiment has maintained a record of the vehicle assigned to the specified service request.

In the case of an active service request, the VTMD will then determine the location of the assigned vehicle (by virtue of the VTMD's continuous service vehicle tracking functionality), determine its distance from the pickup location, estimate the travel time required for the service vehicle to reach this location, and provide an updated Estimated Time of Arrival (ETA). This updated ETA will then be returned to the customer, for display on the cellular telephone. The customer thus receives confirmation that the service request is still active (that is, it has not been lost or discarded), and an update on the expected pickup time.

In the case of a service reservation, the customer would receive a confirmation that the reservation is still active (that is, it has not been lost or discarded). And as the execution time of the reservation draws near, and a service vehicle has been identified and dispatched, the customer would receive further information that a vehicle has been dispatched and is en route, along with ETA information as discussed above.

It is not unusual that after making a service request, a customer later decides to cancel it. A further function that may be enabled, by recording the RCN within the cellular telephone, is the ability to cancel a service request on demand. As above this requires only selection of the service request or service reservation desired for cancellation, followed by appropriate button manipulation to transmit the cancellation message, with the associated RCN. The RD system receives the message, interacts with the VTMD system to cancel the service request or reservation, and returns confirmation to the cellular telephone.

In one embodiment it is envisioned that a customer may travel outside of his or her home region. In that situation, continuing to target a taxi fleet or fleets operating within their home region would be of little value. However, by active or passive invocation of a radiolocation technology, the application could discover that its host cellular telephone is no longer located in its nominal home region. In such an event, the application could be advised of a taxi fleet or list of taxi fleets, operating in the region of the cellular telephone's current location, which utilize the Recognition and Dispatch system as describe elsewhere herein. In this way, the customer would automatically be able to hail taxis within their current geographic location.

Note that the grammar or grammar set used for performing recognition of utterances that specify a pickup location would be those appropriate for the current active geographic location. That is, the grammar or grammar set could be determined by the general geographic locale of the cellular telephone, for each individual utterance that is processed. Indeed, this scheme points to an embodiment of a single central ASR system performing pickup location utterance recognition for a multitude of distinct geographic locations, with active or passive radiolocation technology, or other means (notably active identification by the user of the city in which the taxi is desired), used to select the appropriate grammar or grammar set to be used in the recognition process.

One embodiment recognizes the possibility that during peak commuting hours, no service vehicles are available for on-demand dispatch. Nevertheless, a customer could still be provided with identification of a nearby designated taxi queue (also known as taxi stand) location.

In this mode of operation, the customer enters their current location by whatever means (spoken command, radiolocation, text entry). Upon appropriate activation by the customer, this location is sent to the RD system, marked as a request to find the nearest taxi queue. This location is identified by the RD system, which returns it to the cellular telephone, possibly with customized instructions for how to reach this location on foot, from the customer's current location.

This mode of operation could also be passively invoked, as follows. Consider the case where the customer sends a regular service request to the RD system, but the VTMD system cannot fulfill it, for whatever reason. Instead of simply announcing the failure to fulfill the request, and offering no further recourse (and perhaps thereby motivating them to seek service from a competing taxi fleet), the RD system could instead provide the location of the nearest taxi queue, optionally with directions to reach it.

In various embodiments, additional methods for using radiolocation can be used to improve the speech recognition accuracy. Whether actively or passively invoked, radiolocation technology provides an estimate of the cellular telephone's current geographic location, hereafter denoted g, and an approximate radius of precision, denoted r. If the radius of precision r is not available as a byproduct of the estimation of the geographic location g, it may be set to a nominal or default value based upon the radiolocation technology used. Thus, for a high accuracy technology, we would set r=15 meters, for a medium accuracy technology, r=50 meters, and for a low accuracy technology r=500 meters. We will refer to the ordered pair ⟨g,r⟩ as a geographic location pair, or just a location pair, and denoted it by the symbol L. We will write C(g, r) or C(L) for the circle centered at g, with radius r. The methods disclosed here apply to the decoding of an utterance located at or near g.

In the discussion that follows, a known Bayesian method for automatic speech recognition is referenced. A detailed discussion can be found for instance in *Statistical Methods for Speech Recognition*, Frederick Jelinek, The MIT Press, 1998, ISBN 0-262-10066-5, Section 1.2. In this example, the word sequence W*, decoded from a given acoustic input or utterance A, is nominally computed via the Bayesian minimum error decoding formula:

$$W^* = \arg\max_W P(A|W) \cdot P(W).$$

In this formula, the expression P(A|W) stands for the acoustic model, and gives the probability of observing the acoustic input A, given that the spoken word sequence was W. Likewise, the expression P(W) represents the language model or preference model, which gives the prior probability of word sequence W.

Probability theory then provides an analogous formula in the presence of optional conditioning information L, namely:

$$W^* = \arg\max_W P(A|W,L) \cdot P(W|L).$$

In one method for improving speech recognition accuracy, the location pair L in a post-processing step is used. Assuming a current location pair L=⟨g, r⟩ is available, an utterance from a cellular telephone located at or near g is decoded by first adjusting the speech recognition system to generate a longer than usual n-best list. This provides, for example, a list of decodings $d_1, d_2, \ldots$. Rather than threshold and winnow this list, as described elsewhere herein, with the location pair L=⟨g,r⟩ in hand, the associated confidence scores are instead first re-estimated, according to how close the decoded addresses lie to the nominal cellular telephone location g, and the list of decodings is re-ranked. This re-ranking may be as simple as rejecting (or setting to a nominal minimal confidence score) any decoding $d_i$ that lies outside the circle C(L). Or a more sophisticated approach may be used, which combines the nominal confidence score of a decoding $d_i$, the location pair L, known characteristics of the radiolocation technology used to obtain L, and the proximity of g to the physical location corresponding to the address named in $d_i$, to generate a revised confidence score, either raised or lowered from its nominal value. This re-ranked list may then be winnowed and/or presented to the customer for selection and confirmation, as described elsewhere herein.

In another method of improving speech recognition accuracy, the language model or preference model P(W)—which should be noted in passing may be the uniform model that invariably assigns a constant value, regardless of the word sequence W—is replaced by a model P(W|L), conditioned on the location pair L.

For instance, street names, listed within the underlying street address grammar or grammar set G, used to decode the utterance in question, may have their prior probabilities raised, if some segment of the named street lies within C(L). The amount of increase may depend upon the closest approach of the street to the nominal estimated location g, upon the length of the street segment that falls within C(L), some combination of these quantities, or some other algorithm involving L and the named street.

Conversely, in what amounts to the same thing, streets falling outside of C(L), or lying far from g, will have the prior probabilities of their names reduced in the grammar G, for the decoding of the given utterance.

In this way, the internal operation of the speech recognition system will be directly affected by the conditioning information L.

Radiolocation can be used in other embodiments to improve the speech recognition accuracy. In one embodiment, a customer's spoken utterance is a combined, single statement of both a city and an address. In another embodiment, this is handled as two separate statements, one utterance being the city and the other utterance being the address. However, radiolocation can be used to provide essentially the same information as the first statement, namely the city, thus freeing the customer to only having to speak the requested address for the service vehicle. Alternatively, in yet another embodiment, the most recently specified city could simply be used as a default.

In a still further alternative embodiment, the ten largest cities for the country in which the cellular telephone normally operates are pre-populated in the system. That way, in an embodiment of the system that requires the specification of the city and pickup address in two separate utterances or user actions, if a customer wishes to hail a taxi in one of those cities, all they have to do is select from one of them via, for example, a drop-down list displayed on the cellular telephone.

In a yet further alternative embodiment, consider the case where the locale of operation of the cellular telephone, as determined by means either active (viz, the user explicitly identifies the city in which a taxi is being sought) or passive (viz, the general geographic location of the cellular telephone is determined by radiolocation technology), is one that does not currently support the various functionalities described herein. In such a case, the application may determine the telephone number of a conventional, human-manned central dispatch office that serves that locale, and either present this number for the user to hand-dial, or provide a means to automatically dial the number by pressing or activating a given button or control. The application may determine this number by either consulting a list of locales and associated dispatch office numbers, pre-programmed within the application, or by over-the-air consultation of a database containing such information, located at the recognition and dispatch server.

It is also known in the art that the population within a country or geographic region, nominally speaking a common language, may nevertheless exhibit considerable variation in the spoken characteristics of their shared language. For instance, within the country of Italy, a region of modest geographic extent, linguists recognize over 20 distinct dialects, each with its own phonological characteristics.

For this reason, assuming that appropriately localized acoustic models are available, it may be advantageous in an embodiment to condition the acoustic model itself on the location pair L. In this case, the estimated location g may be used (possibly in conjunction with information about whether the customer is roaming outside his or her home location, in which case the nominal home location would be used in what follows, and the current roaming location ignored) to select an appropriate, dialect-specific acoustic model, either for wholesale use in decoding, or as a mixture component with a more general model.

What is claimed is:

1. A method of dispatching a service vehicle comprising:
receiving into a cellular telephone a spoken utterance from a customer indicating a requested location for a service vehicle, wherein the requested location is other than a present location of the customer when the spoken utterance is received;

digitizing or coding in the cellular telephone the received spoken utterance;

transmitting the digitized or coded spoken utterance as a data communication from the cellular telephone to a speech recognition system;

identifying a pickup location by interpreting the transmitted spoken utterance in the speech recognition system;

transmitting the pickup location from the speech recognition system to a vehicle dispatch system;

matching the pickup location to a service vehicle in the vehicle dispatch system; and dispatching the matched service vehicle to the pickup location.

2. The method of claim 1 further comprising the following before transmitting the pickup location from the speech recognition system to the vehicle dispatch system:

transmitting the pickup location as a data communication from the speech recognition system to the cellular telephone; and receiving from the customer a confirmation that the transmitted pickup location matches the requested location for the service vehicle.

3. The method of claim 2 wherein the confirmation from the customer that the transmitted pickup location matches the requested location for the service vehicle is via receipt from the customer of one or more button presses on the cellular telephone.

4. The method of claim 2 wherein the confirmation from the customer that the transmitted pickup location matches the requested location for the service vehicle is via receiving into the cellular telephone another spoken utterance from the customer.

5. The method of claim 1 further comprising the following before transmitting the pickup location from the speech recognition system to the vehicle dispatch system:

transmitting the pickup location as a data communication from the speech recognition system to the cellular telephone;

receiving from the customer a correction to the pickup location; and wherein dispatching the matched service vehicle to the pickup location comprises dispatching the matched service vehicle to the corrected pickup location.

6. The method of claim 1 further comprising transmitting other service vehicle dispatch parameters from the cellular telephone to the vehicle dispatch system.

7. The method of claim 1 further comprising transmitting a dispatch confirmation to the cellular telephone.

8. The method of claim 7 wherein the dispatch confirmation includes a confirmation number.

9. The method of claim 7 wherein the dispatch confirmation includes a pickup time.

* * * * *